United States Patent
Sakai

(10) Patent No.: US 11,410,289 B2
(45) Date of Patent: Aug. 9, 2022

(54) CALCULATION METHOD, CALCULATION APPARATUS, AND COMPUTER-READABLE RECORDING MEDIUM

(71) Applicant: FUJITSU LIMITED, Kawasaki (JP)

(72) Inventor: Akira Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 17/129,730

(22) Filed: Dec. 21, 2020

(65) Prior Publication Data

US 2021/0241442 A1 Aug. 5, 2021

(30) Foreign Application Priority Data

Jan. 30, 2020 (JP) .............................. JP2020-014140

(51) Int. Cl.
*G06K 9/00* (2022.01)
*G06T 7/00* (2017.01)
*G06V 10/75* (2022.01)

(52) U.S. Cl.
CPC .......... *G06T 7/0002* (2013.01); *G06V 10/751* (2022.01); *G06T 2207/10016* (2013.01); *G06T 2207/20076* (2013.01)

(58) Field of Classification Search
CPC ......... G06T 7/0002; G06T 2207/10016; G06T 2207/20076; G06V 10/751
USPC ....................................................... 382/103
See application file for complete search history.

(56) References Cited

FOREIGN PATENT DOCUMENTS

| JP | 2001-256500 A | 9/2001 |
|---|---|---|
| JP | 2002-312790 A | 10/2002 |

OTHER PUBLICATIONS

Xiang, Tao, and Shaogang Gong. "Video behavior profiling for anomaly detection." IEEE transactions on pattern analysis and machine intelligence 30.5 (2008): 893-908. (Year: 2008).*
Eiteneuer, Benedikt, Nemanja Hranisavljevic, and Oliver Niggemann. "Dimensionality reduction and anomaly detection for cpps data using autoencoder." 2019 IEEE International Conference on Industrial Technology (ICIT). IEEE, 2019. (Year: 2019).*
Nayak, Sunita, Sudeep Sarkar, and Barbara Loeding. "Distribution-based dimensionality reduction applied to articulated motion recognition." IEEE Transactions on Pattern Analysis and Machine Intelligence 31.5 (2008): 795-810. (Year: 2008).*

(Continued)

*Primary Examiner* — Jonathan S Lee
(74) *Attorney, Agent, or Firm* — Fujitsu Patent Center

(57) ABSTRACT

A non-transitory computer-readable recording medium stores therein a calculation program that causes a computer to execute a process including setting, with regard to each of a plurality of frame images included in moving image data on a captured subject, a time interval region having a predetermined time width in time sequence for detection map information relating a detection result of each of types of feature values to a time sequence of the frame images, acquiring, with regard to each of a plurality of positions in the time interval region, a distribution state of the detection result in the time interval region in a case where a position of the set time interval region is changed in the time sequence in the detection map information, and calculating a distributed representation indicating a set of points obtained by projecting the distribution state in each of the positions onto a low-dimensional space.

8 Claims, 11 Drawing Sheets

(56) References Cited

OTHER PUBLICATIONS

Pokrajac, Dragoljub, and Longin Jan Latecki. "Spatiotemporal blocks-based moving objects identification and tracking." IEEE Visual Surveillance and Performance Evaluation of Tracking and Surveillance (VS-PETS) (2003): 70-77. (Year: 2003).*
Joseph Redmon et al., "You Only Look Once: Unified, Real-Time Object Detection", CVF, arXiv: 1506.02640v5 [cs CV], pp. 779-788, May 9, 2016 (Total 10 pages).
Extended European Search Report dated Jun. 9, 2021 for corresponding European Application No. 20216076.8, 7 pages.
Isensee, Fabian et al., "Automatic Cardiac Disease Assessment on cine-MRI via Time-Series Segmentation and Domain Specific Features", arxiv.org, Cornell University Library, Jan. 25, 2018, 10 pages, XP081306334.
Ali, Mohammed et al., "TimeCluster: dimension reduction applied to temporal data for visual analytics", The Visual Computer, Springer, vol. 35, No. 6, pp. 1013-1026, May 9, 2019, XP036800800.

\* cited by examiner

CALCULATION METHOD, CALCULATION APPARATUS, AND COMPUTER-READABLE RECORDING MEDIUM

CROSS-REFERENCE TO RELATED APPLICATION

This application is based upon and claims the benefit of priority of the prior Japanese Patent Application No. 2020-014140, filed on Jan. 30, 2020, the entire contents of which are incorporated herein by reference.

FIELD

The embodiments discussed herein are related to a calculation program, a calculation method, and a calculation apparatus.

BACKGROUND

There is a known technique for determining whether an object appearing in an image is faulty by using a detection result of the object by an object detection technique. This kind of technique is used for examination using an ultrasonic image, inspection of a defective industrial product, etc.
Non-Patent Document 1: Redmon Joseph, Divvala Santosh, Girshick Ross, Parhadi Ali, "You Only Look Once: Unified, Real-Time Object Detection.", arXiv: 1506.02640v5 [cs. CV], 9 May 2016

SUMMARY

According to an aspect of the embodiments, a non-transitory computer-readable recording medium stores therein a calculation program that causes a computer to execute a process, the process including: setting, with regard to each of a plurality of frame images included in moving image data on a captured subject, a time interval region having a predetermined time width in time sequence for detection map information relating a detection result of each of types of feature values to a time sequence of the frame images; acquiring, with regard to each of a plurality of positions in the time interval region, a distribution state of the detection result in the time interval region in a case where a position of the set time interval region is changed in the time sequence in the detection map information; and calculating a distributed representation indicating a set of points obtained by projecting the distribution state in each of the positions onto a low-dimensional space.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, a related technique has a problem of a reduction in the accuracy of fault determination in some cases. This is because, when the result of object detection is used to determine a fault, the element that is inherently irrelevant to the presence or absence of a fault of the object may affect a determination result. For example, when a result of detection of an object appearing in a moving image is used to determine a fault, the length of the moving image may affect the result of fault determination. The length of the moving image is inherently irrelevant to the presence or absence of a fault of the object.

In one aspect, the embodiments provide a calculation program, a calculation method, and a calculation apparatus capable of improving the accuracy of fault determination using an object detection technique.

Preferred embodiments will be explained with reference to accompanying drawings. Further, the present invention is not limited to the embodiment. Moreover, embodiments may be combined as appropriate to such a degree that there is no contradiction.

Figure 1:
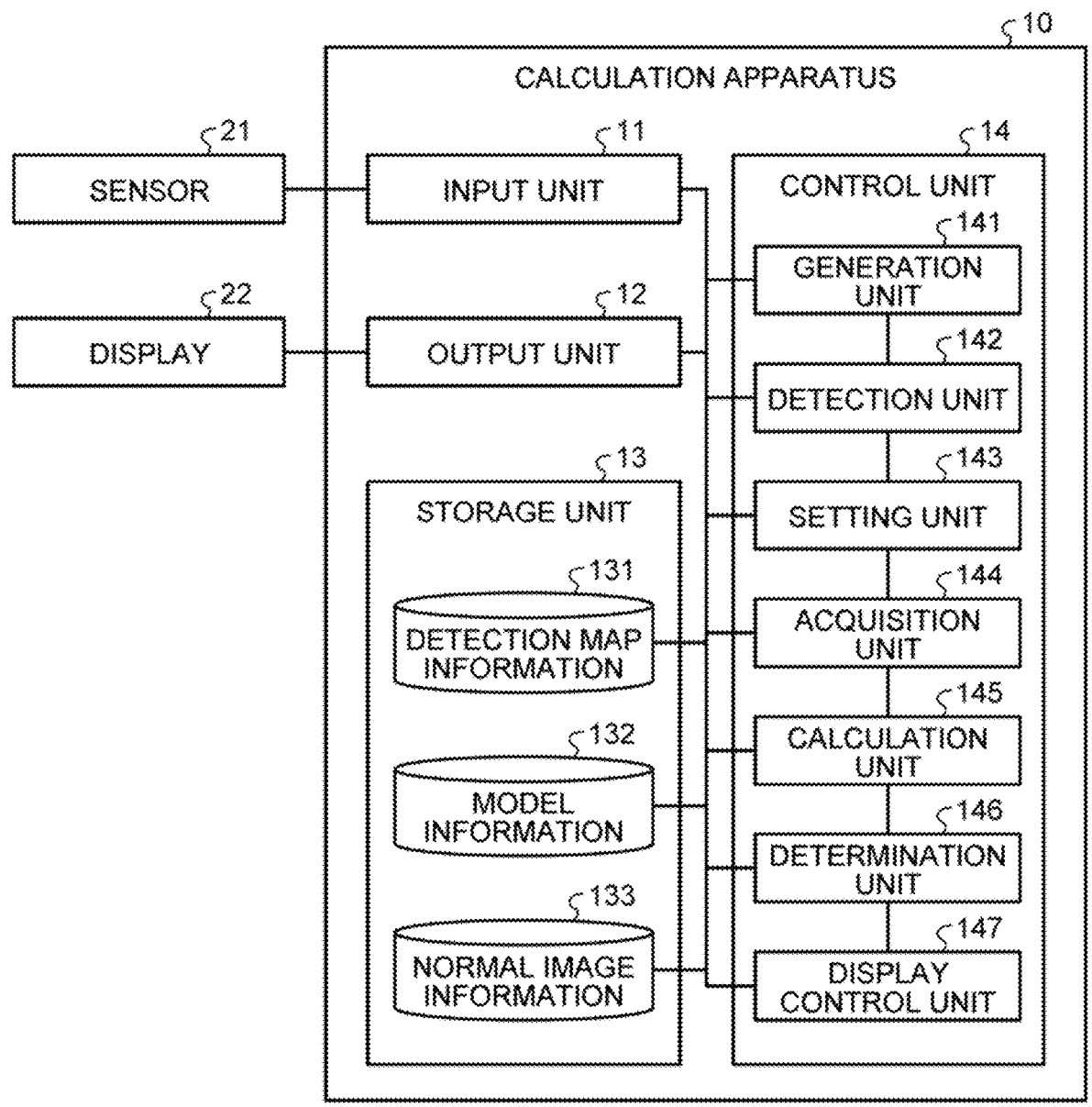
FIG. 1 is a block diagram illustrating an example of the configuration of a calculation apparatus.

With reference to FIG. 1, a configuration of the calculation apparatus according to an embodiment is described. FIG. 1 is a block diagram illustrating an example of the configuration of the calculation apparatus. As illustrated in FIG. 1, a calculation apparatus 10 receives the input of data from a sensor 21. Further, the calculation apparatus 10 outputs data to a display 22.

The calculation apparatus 10 calculates a distributed representation from an image and determines whether the subject appearing in the image has a fault based on the distributed representation. Particularly, the calculation apparatus 10 may calculate a distributed representation from a plurality of images in time sequence. The images in time sequence may be images of frames constituting moving image data.

The sensor 21 is a device that acquires a signal for generating the target image for which a fault is to be determined. For example, the sensor 21 is a probe that irradiates the subject with an ultrasonic wave and receives a reflected wave of the ultrasonic wave. The probe may be used for, for example, medical examination and non-destructive object examination. Further, for example, the sensor 21 may be an RGB camera that captures a subject.

Furthermore, the sensor 21 may directly input the acquired signal to the calculation apparatus 10 or may input the data on the image generated from the signal to the calculation apparatus 10. That is, the calculation apparatus 10 may generate an image based on the signal received from the sensor 21 or may receive an image from the sensor 21.

As illustrated in FIG. 1, the calculation apparatus 10 includes an input unit 11, an output unit 12, a storage unit 13, and a control unit 14. The input unit 11 is an interface to input data. For example, the input unit 11 receives the input of data from the sensor 21. Furthermore, the input unit 11 may receive the input of data via an input device such as a mouse and a keyboard. Further, the output unit 12 is an interface to output data. For example, the output unit 12 outputs data to an output device such as the display 22.

The storage unit 13 is an example of a storage device that stores data, a program executed by the control unit 14, and the like, and is for example a hard disk, a memory, etc. The storage unit 13 includes detection map information 131, model information 132, and normal image information 133.

The detection map information 131 is an example of the information that, with regard to each of a plurality of frame images included in the moving image data on the captured subject, relates the detection result of each of types of feature values to the time sequence of the frame image. For example, according to the present embodiment, it is assumed that the detection map information 131 is a set of xml data corresponding to each frame image. Furthermore, it is assumed that each set of xml data describes multiple types of feature values.

Figure 2:
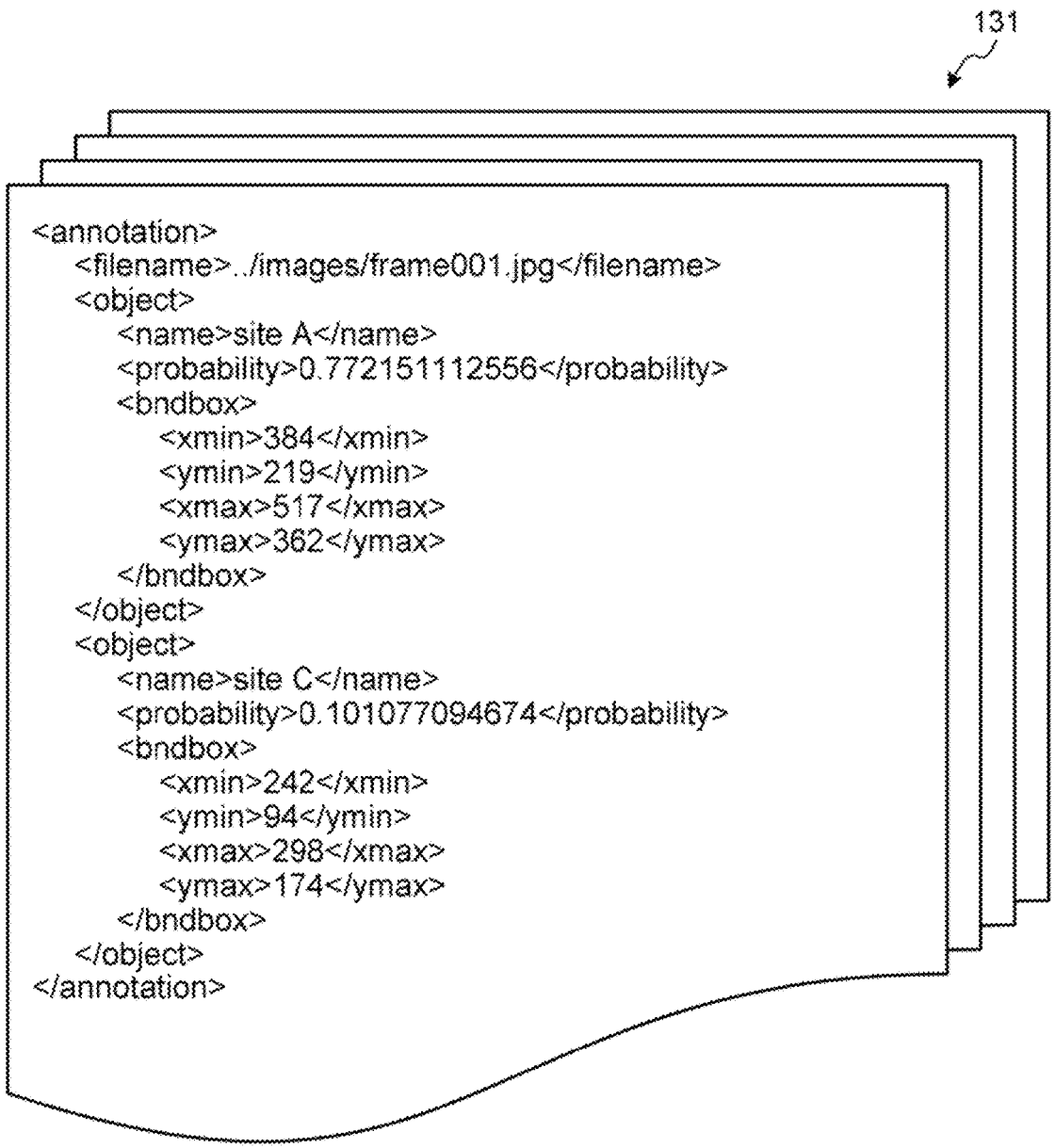
FIG. 2 is a diagram illustrating an example of detection map information.

FIG. 2 is a diagram illustrating an example of the detection map information. As illustrated in FIG. 2, the detection map information 131 is a set of xml data. A filename element of the xml data describes the file path of the corresponding frame image.

Here, according to the present embodiment, it is assumed that the sensor 21 is a probe for examination. Further, it is assumed that the detection map information 131 is a feature value obtained from an ultrasonic image. It is assumed that the feature value includes the degree of certainty that is calculated in accordance with the level of probability that each predetermined site appears in a frame image. Further, it is assumed that the feature value includes the coordinates of two vertices of the rectangle representing the region where each site is estimated to be present in a frame image.

A name element of xml data describes the name of a site. Further, xml data may exclusively describe the information on a site whose degree of certainty is not zero or whose degree of certainty is more than a certain value. Furthermore, a probability element represents the degree of certainty of the site described in the name element. As the probability that the corresponding site is present in the frame image is higher, the degree of certainty is higher.

An xmin element and a ymin element represent the coordinates of one vertex of a rectangle. Further, an xmax element and a ymax element represent the coordinates of a vertex that does not share the sides thereof with the vertex represented by the xmin element and the ymin element. That is, when the coordinates of the two vertices are defined, the position and the size of the rectangle are defined. For example, the coordinates represented by the xmin element and the ymin element define the upper left vertex of the rectangle. Further, the coordinates represented by the xmax element and the ymax element define the lower right vertex of the rectangle.

The xml data illustrated in FIG. 2 corresponds to the file of the frame image with the name "frame001.jpg". Furthermore, the xml data in FIG. 2 indicates that a site A is present in the rectangular region having a point (384, 219) and a point (517, 362) as vertices and the degree of certainty thereof is 0.7721.51112556. Further, the xml data in FIG. 2 indicates that a site C is present in the rectangular region having a point (242, 94) and a point (298, 174) as vertices and the degree of certainty thereof is 0.101077094674. Moreover, the coordinates may be expressed in units of, for example, pixels.

The model information 132 is the information such as a parameter for configuring a model to calculate a distributed representation. According to the present embodiment, it is assumed that the model is an autoencoder. In this case, the model information 132 includes a parameter such as a weight that is set in each unit of the autoencoder.

The normal image information 133 is the information about a frame image of a subject in the normal state. The normal image information 133 may be a frame image itself, a feature value of a frame image, or a distributed representation obtained from a feature value of a frame image.

The control unit 14 is implemented when, for example, a central processing unit (CPU), a micro processing unit (MPU), a graphics processing unit (GPU), or the like, executes a program stored in an internal storage device with a RAM as a work area. Further, the control unit 14 may be implemented by an integrated circuit such as an application specific integrated circuit (ASIC) or a field programmable gate array (FPGA). The control unit 14 includes a generation unit 141, a detection unit 142, a setting unit 143, an acquisition unit 144, a calculation unit 145, a determination unit 146, and a display control unit 147.

The generation unit 141 generates a frame image based on the data input from the sensor 21. When a frame image is input from the sensor 21, the generation unit 141 does not need to generate a frame image.

The detection unit 142 extracts a feature value from the frame image and stores the extracted feature value as the detection map information 131 in the storage unit 13. The detection unit 142 detects the feature value including the degree of certainty by using a detection model having learnt the image of each site. An object detection algorithm such as YOLO, SSD (Single Shot MultiBox Detector), or Faster-RCNN (Regional Convolutional Neural Network) may be used as the detection model.

The detection unit 142 detects, for each of frame images, the degree of certainty that is the index corresponding to the level of probability that each of predetermined objects is present. Each of the objects corresponds to each site to be detected. The detection unit 142 further detects the size and the position of the rectangular region which is present in a frame image and in which the presence probability of the object is more than a predetermined value.

Figure 3:
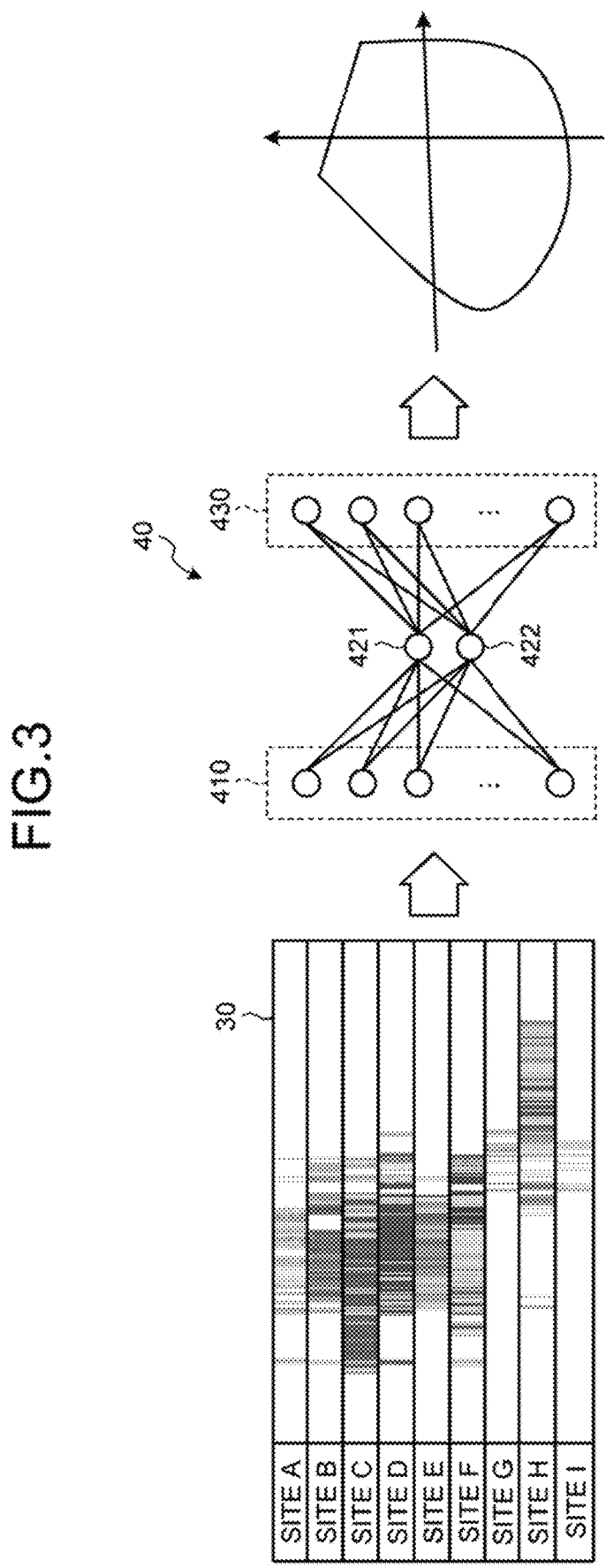
FIG. 3 is a diagram illustrating a method for calculating a distributed representation.

The setting unit 143, the acquisition unit 144, and the calculation unit 145 perform processing related to the calculation of a distributed representation. FIG. 3 is a diagram illustrating the method for calculating a distributed representation. Here, at least some of the feature values included in the detection map information 131 may be mapped in time sequence. The diagram indicated by reference numeral 30 in FIG. 3 is obtained by mapping the degree of certainty of each site in time sequence. That is, the detection map information 131 may be referred to as a two-dimensional map in which a detection result is mapped on a two-dimensional plane whose first axis is one of the types of feature values and whose second axis is the time sequence. Here, this type of diagram is referred to as a barcode like timeline. Further, the barcode like timeline may be simply referred to as a timeline.

In the example of FIG. 3, as the degree of certainty is higher, the color of the bar is darker. The method for calculating a distributed representation is described below based on the assumption that the autoencoder that calculates a distributed representation has been already trained. The method for training the autoencoder is described below.

The setting unit 143 sets the time interval region having a predetermined time width in time sequence with regard to the detection map information 131. The interval region is referred to as a kernel. The kernel may be instead referred to as a window, etc. Further, the detection map information 131 is an example of the information that, with regard to each of the frame images included in the moving image data on the captured subject, relates the detection result of each of the types of feature values to the time sequence of the frame image.

The acquisition unit 144 acquires, with regard to each of a plurality of positions in the interval region, the distribution state of a detection result in the interval region in a case where the position of the set interval region is changed in time sequence in the detection map information 131. The degree of certainty and the coordinates of the rectangular region are examples of the distribution state. Further, the positions in the interval region correspond to times. That is, the acquisition unit 144 acquires, from the detection map information 131, the degree of certainty of each site and the size and the position of the rectangular region in the frame image corresponding to each time as a distribution state.

The calculation unit 145 calculates the distributed representation indicating the set of points obtained by projecting the distribution state in each of the positions onto a low-dimensional space. As illustrated in FIG. 3, the calculation unit 145 inputs the distribution state to an autoencoder 40 having an intermediate layer made up of two units to calculate the distributed representation indicating the set of points projected onto a two-dimensional space. The autoencoder 40 is configured based on the model information 132. Further, the autoencoder 40 includes an input layer 410, an intermediate unit 421, an intermediate unit 422, and an output layer 430. The distributed representation is an intermediate feature value output by the intermediate unit 421 and the intermediate unit 422.

Figure 4:
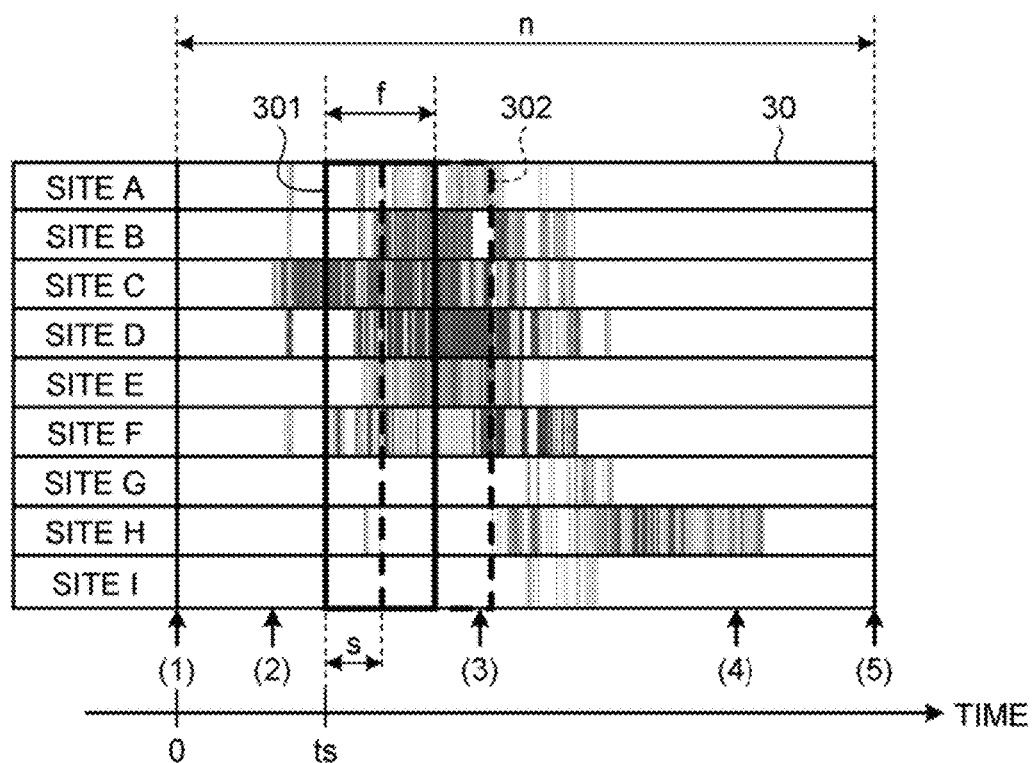
FIG. 4 is a diagram illustrating an example of a barcode like timeline of a detection subject.

FIG. 4 is a diagram illustrating an example of the barcode like timeline of a detection subject. FIG. 4 is a diagram illustrating the degree of certainty of each site in a barcode like timeline and illustrating various setting values for calculating a distributed representation. As illustrated in FIG. 4, a timeline 30 includes n frame images.

Further, the setting unit 143 sets a kernel size f and a stride s. Specifically, the f number of successive frame images forms a kernel. Further, the kernel is slid by the s number of frame images. For example, when the t-th slide is executed, a kernel 301 includes the frame images from a time ts to a time (t+1)s. Further, when the t+1-th slide is executed, a kernel 302 includes the frame images from the time (t+1)s to a time (t+2)s.

Here, the set of the t-th frame images, i.e., the frame images included in the kernel 301, are represented as $m_t$ (0≤t≤T). Here, an encoder-side output of the autoencoder is obtained by $y_t$=encoder($m_c$). The calculation unit 145 obtains encoder-side outputs $\{y_1, y_2, \ldots, y_T\}$ as a distributed representation with regard to all ts. Further, $y_t$ may be a vector having the same number of dimensions as that of the intermediate unit of the autoencoder.

Based on the comparison between the acquired distributed representation and the distributed representation obtained from the determination target moving image data on the captured subject, the determination unit 146 determines whether the determination target moving image data is data on the captured subject in a faulty state. Further, the display control unit 147 displays, on the screen, the trajectory of the point projected onto the two-dimensional space in time sequence. As described above, the determination of a faulty state may be executed automatically by the determination unit 146 or may be executed manually by the user who views the screen displayed by the display control unit 147.

Figure 5:
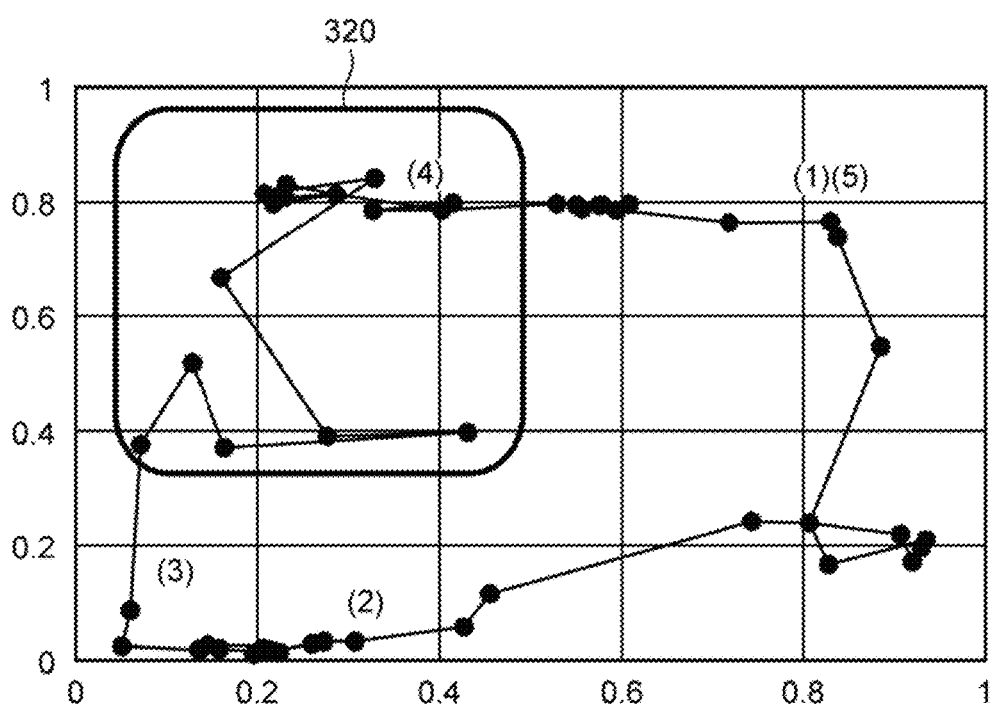
FIG. 5 is a diagram illustrating an example of a trajectory of a distributed representation of the detection subject.

FIG. 5 is a diagram illustrating an example of the trajectory of the distributed representation of the detection subject. The calculation unit 145 inputs the timeline 30 illustrated in FIG. 4 to the autoencoder 40 to calculate a distributed representation. Then, the display control unit 147 depicts the trajectory of the distributed representation as illustrated in FIG. 5.

Here, it is assumed that the setting unit 143 sets the kernel size to 10 and sets the stride to 5. Although the degree of certainty is exclusively displayed on the timeline 30 in FIG. 4, in actuality, the calculation unit 145 inputs the feature value including the coordinates to the autoencoder 40. Specifically, as illustrated in FIG. 2, there are the feature values of five elements, i.e., the probability element, the xmin element, the ymin element, the xmax element, and the ymax element, for each site. Further, the number of sites is nine. In this case, the calculation unit 145 inputs 9 (the number of sites)×5 (the number of feature values)×10 (the kernel size)=450 values to the autoencoder 40. Moreover, it is assumed that the autoencoder 40 uses sigmoid as an activating function.

Figure 6:
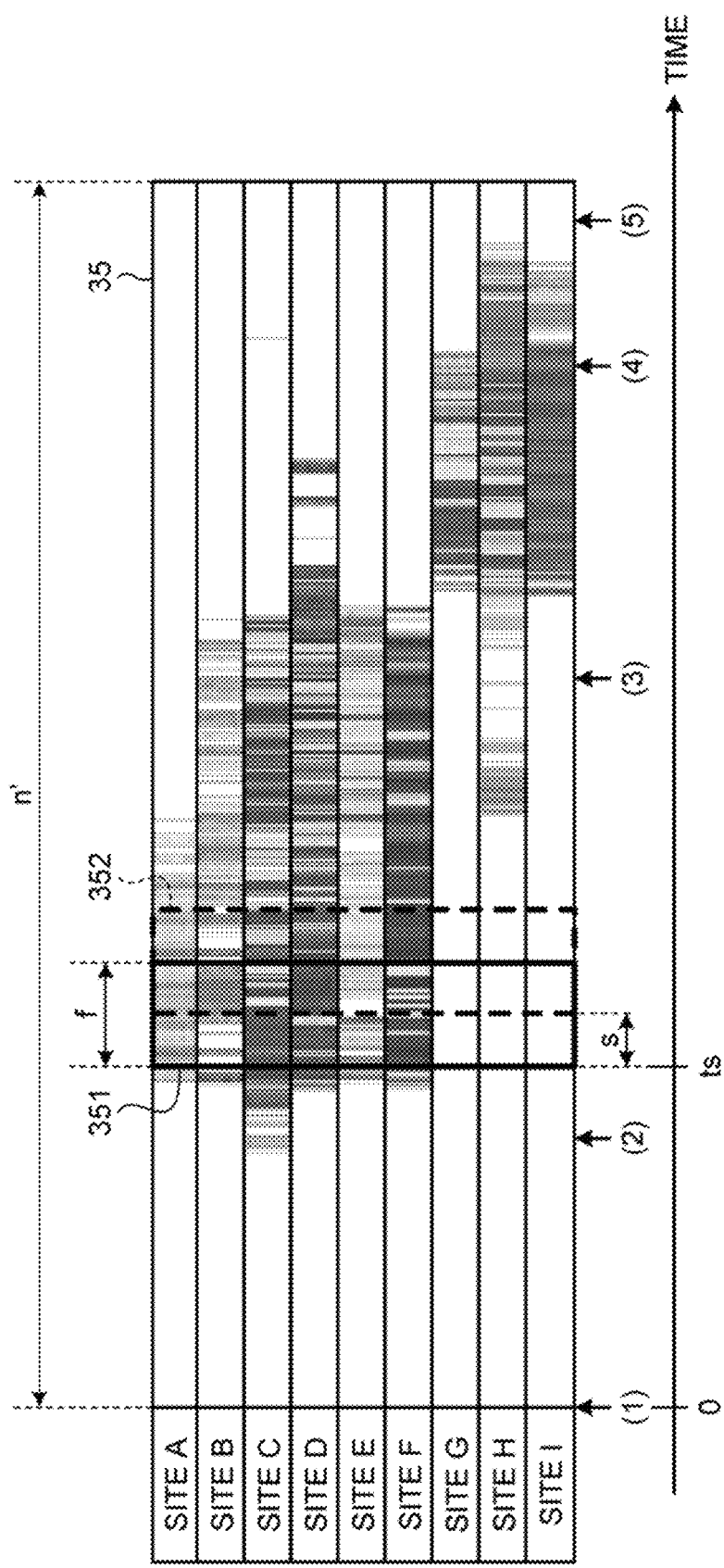
FIG. 6 is a diagram illustrating an example of a barcode like timeline of a subject in a normal state.
Figure 7:
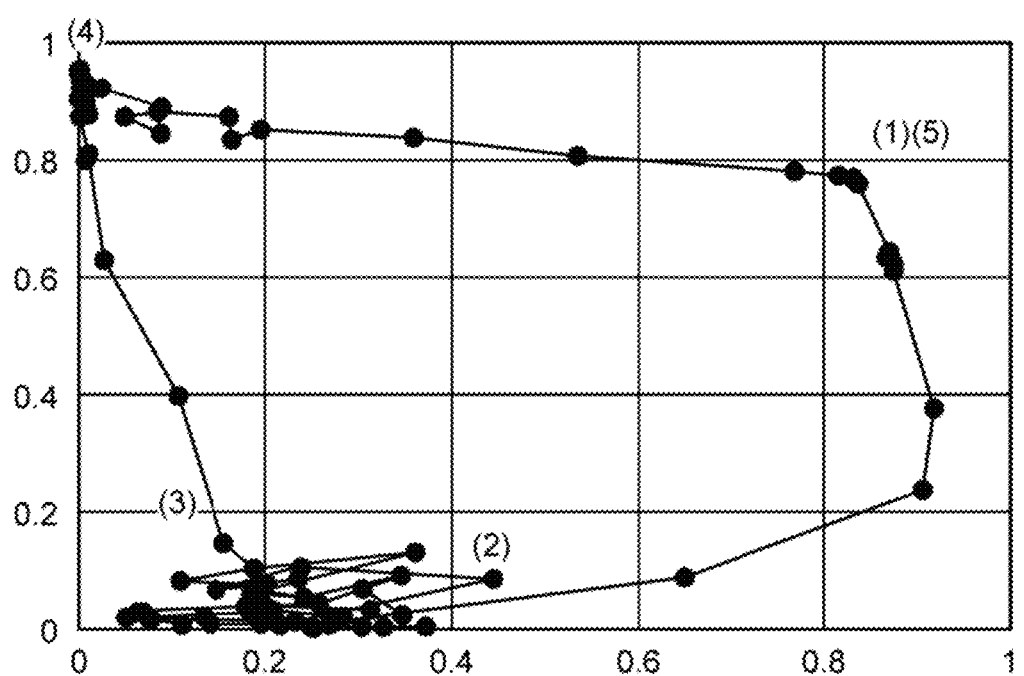
FIG. 7 is a diagram illustrating an example of a trajectory of a distributed representation of the subject in the normal state.

Here, with reference to FIGS. 6 and 7, the distributed representation of the subject in the normal state is described. FIG. 6 is a diagram illustrating an example of a barcode like timeline of the subject in the normal state. FIG. 7 is a diagram illustrating an example of the trajectory of the distributed representation of the subject in the normal state.

For example, the acquisition unit 144 acquires a timeline 35 in the normal state illustrated in FIG. 6 from the normal image information 133. The calculation unit 145 calculates the distributed representation of the subject in the normal state from the timeline 35. Here, as illustrated in FIG. 6, for the timeline 35, the setting unit 143 sets the same kernel size and the same stride as those set for the timeline 30 of the detection subject. Meanwhile, the number of frame images of the timeline 35 may be different from the number of frame images of the timeline 30. Further, the timeline 35 of the subject in the normal state may be used for training the autoencoder 40.

Phases (1) to (5) illustrated in FIGS. 4 to 7 represent predetermined phases that are to be noticed during fault determination. As illustrated in FIG. 7, the distributed representation obtained from the timeline 35 in the normal state represents the fluctuations in the phases (2) and (3) and the phases (3) and (4) as abstraction. On the other hand, the distributed representation represents the change from the phases (2) and (3) to the phases (3) and (4) with an emphasis. Here, the abstraction means a small movement of the trajectory. Further, the emphasis means a large movement of the trajectory.

Here, when FIGS. 7 and 5 are compared with each other, the trajectories in the phases (3) and (4) are largely different. Specifically, in FIG. 7, the trajectory passes through the position near the coordinates (0, 1). On the other hand, in FIG. 5, the trajectory does not pass through the position near the coordinates (0, 1). For this reason, the user may determine that FIG. 5 illustrates the trajectory of the distributed representation in a faulty state. Further, for example, the determination unit 146 may determine a fault when the trajectory of the distributed representation does not pass through the region in the upper left of the coordinates (0.2, 0.8).

Here, the display control unit 147 may cause the display 22 to present the trajectory of the distributed representation illustrated in FIG. 5 via the output unit 12. Further, as illustrated in FIG. 5, the display control unit 147 may present, on the screen, the frame to emphasize a region 320 based on which a fault is determined.

Figure 8:
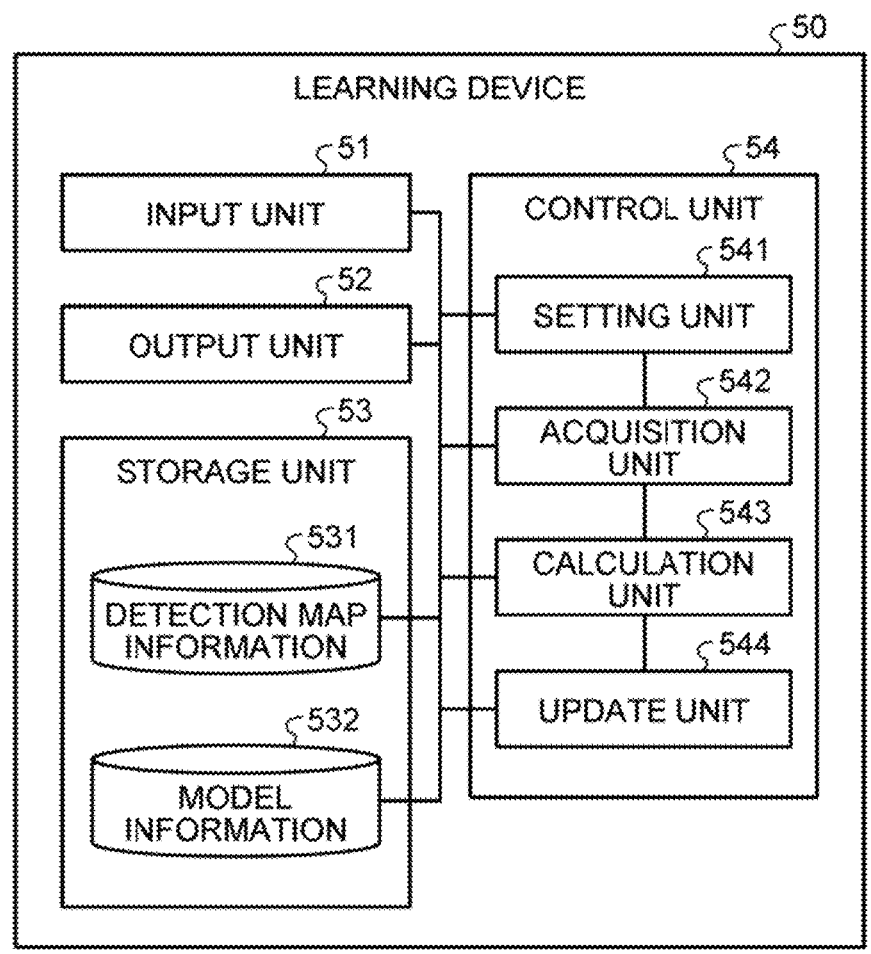
FIG. 8 is a block diagram illustrating an example of the configuration of a learning device.

With reference to FIG. 8, a configuration of a learning device that trains the autoencoder 40 is described. FIG. 8 is a block diagram illustrating an example of the configuration of the learning device. As illustrated in FIG. 8, a learning device 50 includes an input unit 51, an output unit 52, a storage unit 53, and a control unit 54. The input unit 51 is an interface to input data. The output unit 52 is an interface to output data.

The storage unit 53 is an example of a storage device that stores data, a program executed by the control unit 54, and the like, and is, for example, a hard disk, a memory, etc. The storage unit 53 has detection map information 531 and model information 532.

The detection map information 531 is data having the format similar to that of the detection map information 131. However, the detection map information 531 is a feature value, or the like, detected from a normal-state frame image prepared for learning.

As is the case with the model information 132, the model information 532 is a parameter, or the like, for configuring the autoencoder 40. While the model information 132 is a trained parameter, the model information 532 may be a parameter that has not been trained or is being trained.

The control unit 54 is implemented when, for example, a CPU, an MPU, a GPU, or the like, executes a program stored in an internal storage device with a RAM as a work area. Further, the control unit 54 may be implemented by an integrated circuit such as an ASIC or an FPGA. The control unit 54 includes a setting unit 541, an acquisition unit 542, a calculation unit 543, and an update unit 544.

It is assumed that the setting unit 541, the acquisition unit 542, and the calculation unit 543 have the same function as those of the setting unit 143, the acquisition unit 144, and the calculation unit 145, respectively. The update unit 544 updates the model information 532 based on a calculation result obtained by the calculation unit 145.

Here, it is assumed that K barcode like timelines of the subject in the normal state are prepared. Here, the set of the t-th frame images of the k-th barcode like timeline, i.e., the frame images included in a kernel 351 in FIG. 6, are represented as $m_t^k$ ($0 \le t \le T_k$). The calculation unit 543 calculates an encoder-side output encoder ($m_t^k$) and further calculates a decoder-side output decoder (encoder ($m_t^k$)).

Then, the update unit 544 updates a parameter $\theta_{encoder}$ of the encoder and a parameter of the decoder included in the model information 532 so as to minimize a loss function Loss (decoder (encoder ($m_t^k$))). Here, the update unit 544 updates the model information 532 under the conditions below.

Figure 9:
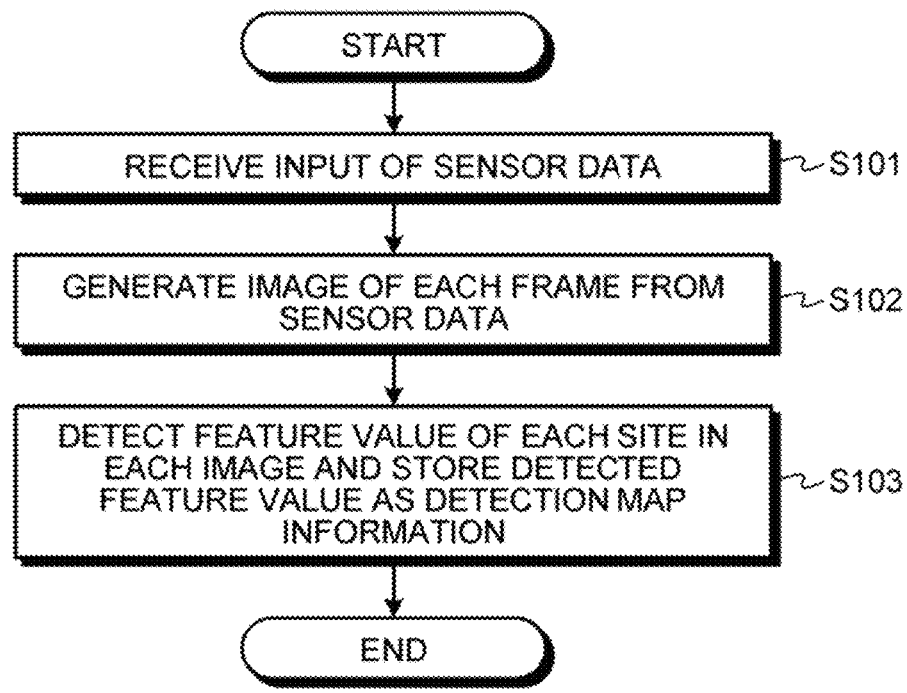
FIG. 9 is a flowchart illustrating a flow of a detection process.

Learning parameter: adagrad
Learning rate: 0.3
Repetition count: 100000 times
Batch size: 1
Loss function: least square error With reference to FIG. 9, the flow of a detection process performed by the calculation apparatus 10 is described. FIG. 9 is a flowchart illustrating the flow of a detection process.

The detection process is primarily performed by the generation unit 141 and the detection unit 142 of the calculation apparatus 10.

As illustrated in FIG. 9, the calculation apparatus 10 first receives the input of sensor data (Step S101). Subsequently, the calculation apparatus 10 generates the image of each frame from the sensor data (Step S102). Then, the calculation apparatus 10 detects the feature value of each site in each image and stores the detected feature value as detection map information in the storage unit 13 (Step S103).

Figure 10:
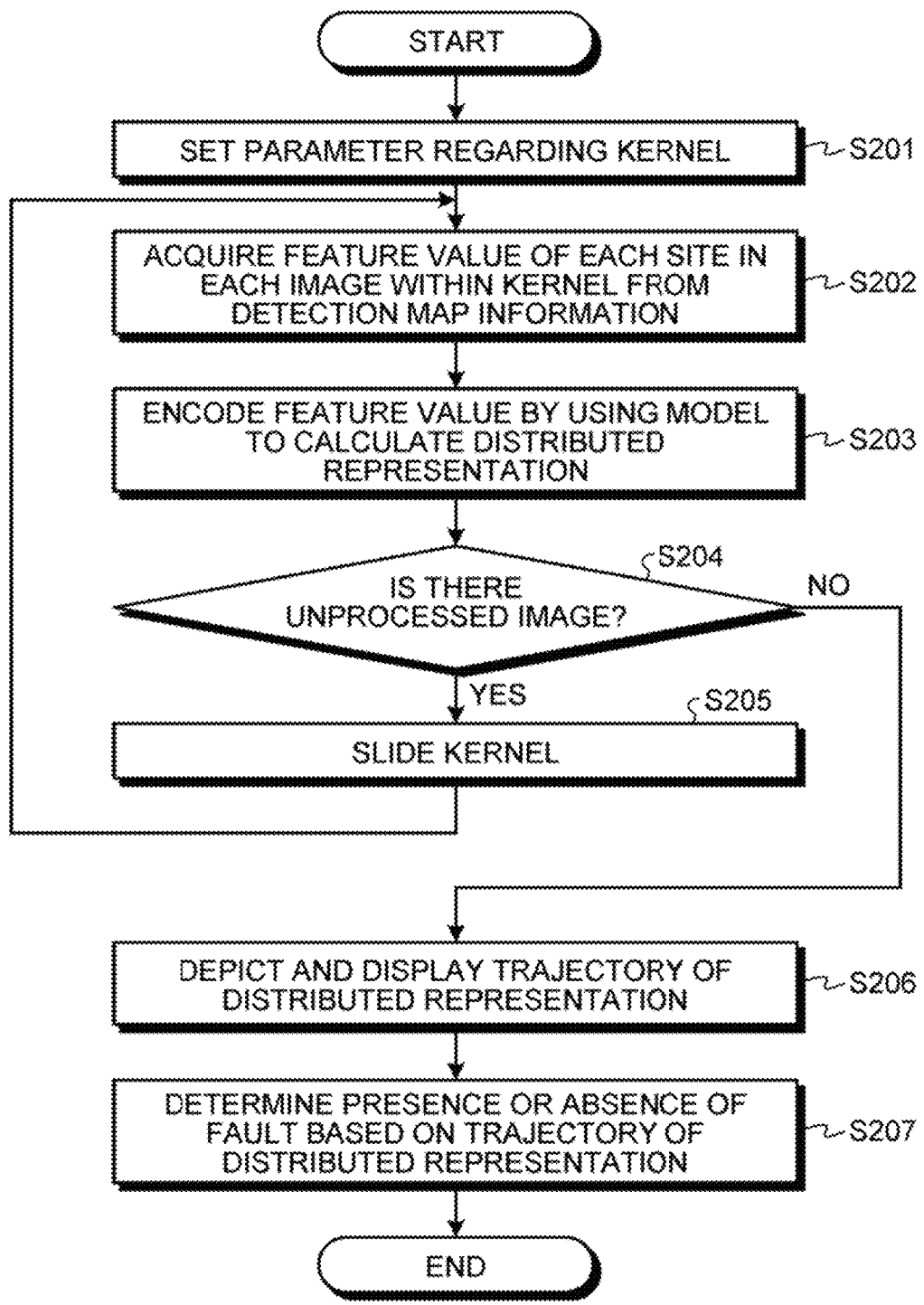
FIG. 10 is a flowchart illustrating a flow of a determination process.

The flow of a determination process performed by the calculation apparatus 10 is described with reference to FIG. 10. FIG. 10 is a flowchart illustrating the flow of the determination process. The determination process is primarily performed by the calculation unit 145 and the determination unit 146 of the calculation apparatus 10.

As illustrated in FIG. 10, the calculation apparatus 10 first sets a parameter regarding a kernel (Step S201). Subsequently, the calculation apparatus 10 acquires the feature value of each site in each image within the kernel from the detection map information 131 (Step S202). Then, the calculation apparatus 10 encodes the feature value by using the model to calculate a distributed representation (Step S203).

Here, the calculation apparatus 10 determines whether there is an unprocessed image (Step S204). When there is an unprocessed image (Yes at Step S204), the calculation apparatus 10 slides the kernel (Step S205) and returns to Step S202 so as to repeat the process. Conversely, when there is no unprocessed image (No at Step S204), the calculation apparatus 10 depicts and displays the trajectory of the distributed representation (Step S206). Then, the calculation apparatus 10 determines the presence or absence of a fault based on the trajectory of the distributed representation (Step S207).

Figure 11:
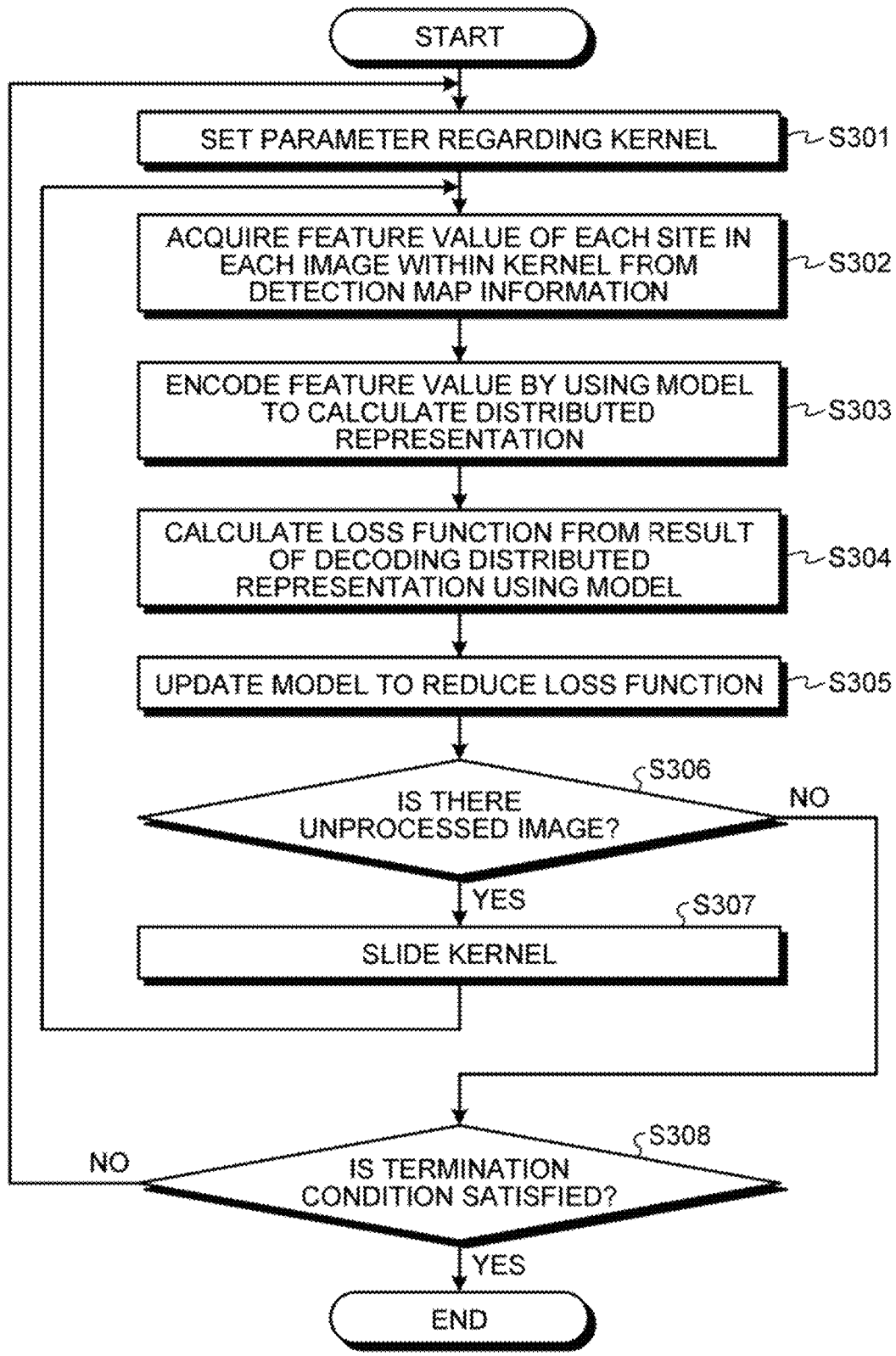
FIG. 11 is a flowchart illustrating a flow of a learning process.

The flow of the learning process performed by the learning device 50 is described with reference to FIG. 11. FIG. 11 is a flowchart illustrating the flow of the learning process.

As illustrated in FIG. 11, the learning device 50 first sets a parameter regarding a kernel (Step S301). Subsequently, the learning device 50 acquires, from the detection map information 531, the feature value of each site in each image within the kernel (Step S302). Then, the learning device 50 encodes the feature value by using the model to calculate a distributed representation (Step S303). Further, the learning device 50 calculates a loss function from the result of decoding the distributed representation using the model (Step S304). Moreover, the learning device 50 updates the model so as to reduce the loss function (Step S305).

Here, the learning device 50 determines whether there is an unprocessed image (Step S306). When there is an unprocessed image (Yes at Step S306), the learning device 50 slides the kernel (Step S307) and returns to Step S302 to repeat the process. Conversely, when there is no unprocessed image (No at Step S306), the learning device 50 determines whether the termination condition for the learning process is satisfied (Step S308).

When the termination condition for the learning process is satisfied (Yes at Step S308), the learning device 50 terminates the process. Conversely, when the termination condition for the learning process is not satisfied (No at Step S308), the learning device 50 returns to Step S301 to repeat the process. For example, the termination condition for the learning process is that the process from Step S301 to Step S307 has been repeated a predetermined number of times.

As described above, the setting unit 143 sets, with regard to each of a plurality of frame images included in the moving image data on a captured subject, the time interval region having a predetermined time width in time sequence for the detection map information relating the detection result of each of the types of feature values to the time sequence of the frame image. The acquisition unit 144 acquires, with regard to each of a plurality of positions in the interval region, the distribution state of the detection result in the interval region in a case where the position of the set interval region is changed in time sequence in the detection map information. The calculation unit 145 calculates the distributed representation indicating the set of points obtained by projecting the distribution state in each of the positions onto a low-dimensional space. In this manner, the calculation apparatus 10 may calculate a distributed representation for each kernel. This allows the calculation apparatus 10 to reduce the effect of the length of the moving image data on the distributed representation. As a result, according to the present embodiment, the accuracy of fault determination using an object detection technique is improved.

An advantage of the present embodiment is described in more detail. First, data such as a barcode like timeline in which the results of object detection from moving image data are arranged in time sequence has characteristics such that the length of the data along the direction in time sequence is indefinite and the data includes noise due to non-detection, improper detection, or insufficient detection of an object. Further, a moving image may include the part where almost the same image continues for several tens of frames or the relevant part present in merely a few frames.

RNN, or the like, is used to acquire a distributed representation for time-series data having an indefinite length. However, due to the above-described characteristics of the time-series data, the technique such as RNN has a problem of the effect of the length itself of the time-series data on a distributed representation, the difficulty of evaluating one phase in time sequence as the distributed representation reflects the phases of the entire time-series data, and high sensitivity to noise.

On the other hand, the calculation apparatus 10 according to the present embodiment continuously calculates a distributed representation by using a kernel that is a part of time-series data. As a result, when the same phase of the moving image continues as indicated in the phases (2) and (3) of FIG. 7, the distributed representation remains in the same region. Therefore, according to the present embodiment, it is possible to reduce the effect of the length itself of the moving image on the distributed representation. Further, as the features in the kernel are averaged according to the present embodiment, the obtained distributed representation has robustness against noise.

When moving image data is obtained from a probe, the phase of the moving image changes due to the movement of the probe by the operator, or the same phase of the moving image continues when the operator holds the probe at the same position. It is considered that the manner of changes in the phase of the moving image is different depending on the subject to be captured or the habit of the operator. According to the present embodiment, obtaining the trajectory of the distributed representation makes it possible to reduce the effect of the factor that changes the phase.

Furthermore, the determination unit 146 determines, based on the comparison between the acquired distributed representation and the distributed representation obtained from determination target moving image data on the captured subject, whether the determination target moving image data is data on a captured subject in a faulty state. For example, the determination unit 146 may compare the difference in the trajectory between the acquired distributed representation and the distributed representation obtained from determination target moving image data that is moving image data on the subject in the normal state to automatically determine a fault.

Furthermore, the detection unit 142 detects, with regard to each of the frame images, the degree of certainty that is the index corresponding to the level of probability that each of predetermined objects is present. The acquisition unit 144 acquires the degree of certainty as a distribution state. This allows the calculation apparatus 10 to evaluate the feature of the moving image data by using the feature of each frame image.

Furthermore, the detection unit 142 further detects the size and the position of the rectangular region which is present in a frame image and whose presence probability of the object is more than a predetermined value, and the acquisition unit 144 acquires the degree of certainty and the size and the position of the rectangular region as a distribution state. Thus, even when the position of the object changes in the moving image, the positional relationship between the objects may be determined.

Further, the calculation unit 145 inputs the distribution states to the autoencoder, which has the intermediate layer made up of two units, to calculate the distributed representation indicating the set of points projected onto the two-dimensional space. As described above, the projection onto a low dimension, i.e., two dimensions, makes it easy to evaluate the trajectory and to intuitively recognize the feature by the user.

Further, the display control unit 147 presents, on the screen, the trajectory of the point projected onto the two-dimensional space in time sequence. This allows the user to intuitively recognize the feature obtained from the moving image data on the subject.

Further, the detection map information may be a two-dimensional map in which a detection result is mapped on a two-dimensional plane whose first axis is one of the types of feature values and whose second axis is the time sequence.

Although the site to be captured by the probe is described as the site A, the site B, or the like, according to the embodiment, it is considered that the site to be captured is, for example, each site related to the heart. In this case, the sites may include the right atrium, the left atrium, the right ventricle, the left ventricle, and the like.

Furthermore, in the description according to the embodiment, it is assumed that the sensor 21 is a probe. The sensor 21 may be an RGB camera. In this case, for example, the RGB camera captures a product moving on a conveyor in the manufacturing line as a moving image. Then, the calculation apparatus 10 calculates a distributed representation from the moving image. The calculation apparatus 10 compares the trajectory of the thus obtained distributed representation with the trajectory of the distributed representation obtained from the moving image of the captured normal product so as to determine a defective product.

The processing procedures, the control procedures, the specific names, and the information including various types of data and parameters described in the above description and drawings may be changed as appropriate except as otherwise described. Furthermore, the specific example, the distribution, the numeric value, and the like, described in the embodiment are merely examples and may be changed as appropriate.

Furthermore, components of each device illustrated are conceptual in function and do not always need to be physically configured as illustrated. Specifically, specific forms of separation and combination of each device are not limited to those illustrated. That is, a configuration may be such that all or some of devices are functionally or physically separated or combined in any unit depending on various types of loads or usage. Moreover, all or any part of the processing functions performed by each device may be implemented by a CPU and a program analyzed and executed by the CPU or by wired logic hardware.

Figure 12:
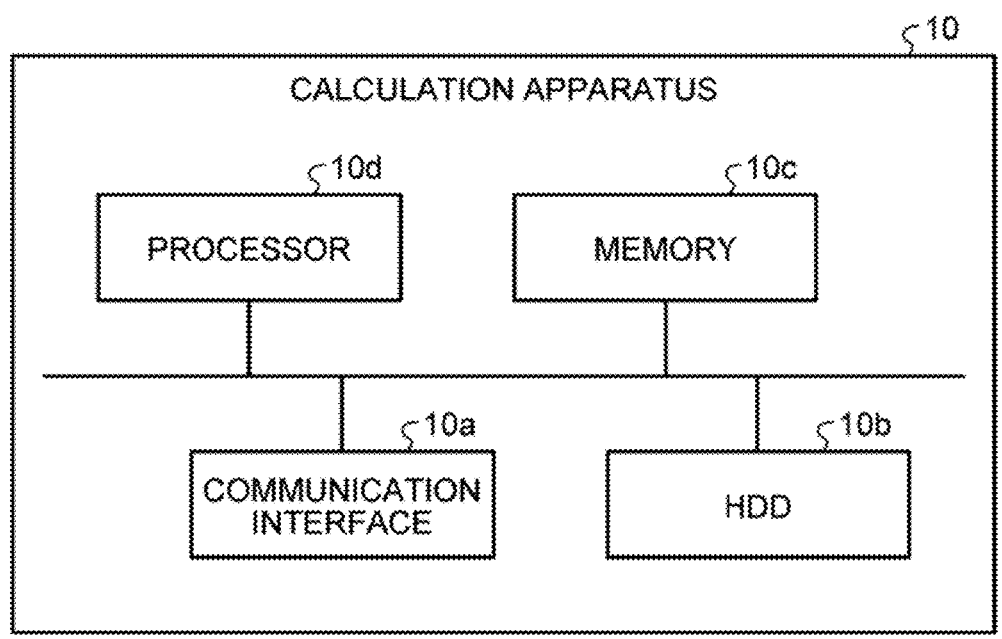
FIG. 12 is a diagram illustrating an example of a hardware configuration.

FIG. 12 is a diagram illustrating an example of the hardware configuration. As illustrated in FIG. 12, the calculation apparatus 10 includes a communication interface 10a, a hard disk drive (HDD) 10b, a memory 10c, and a processor 10d. Further, the communication interface 10a, the HDD 10b, the memory 10c, and the processor 10d illustrated in FIG. 12 are coupled to each other via a bus, etc.

The communication interface 10a is a network interface card, or the like, to communicate with other servers. The HDD 10b stores a program and a DB to perform the functions illustrated in FIG. 1.

The processor 10d is a hardware circuitry that reads the program that executes the same process as that of each processing unit illustrated in FIG. 1 from the HDD 10b, or the like, and loads the program into the memory 10c to implement the process that executes each function described in FIG. 1, etc. That is, the process performs the same function as that of each processing unit included in the calculation apparatus 10. Specifically, the processor 10d reads the program having the same functions as those of the generation unit 141, the detection unit 142, the setting unit 143, the acquisition unit 144, the calculation unit 145, the determination unit 146, and the display control unit 147 from the HDD 10b, etc. Then, the processor 10d executes the process to perform the same processes as those of the generation unit 141, the detection unit 142, the setting unit 143, the acquisition unit 144, the calculation unit 145, the determination unit 146, the display control unit 147, and the like.

As described above, the calculation apparatus 10 operates as an information processing apparatus that reads and executes a program to implement a learning method. Further, the calculation apparatus 10 may use a medium reading device to read the above-described program from a recording medium and execute the read program so as to perform the same function as that in the above-described embodiment. Moreover, the program described in the present embodiment is not always executed by the calculation apparatus 10. For example, the present invention is also applicable to a case where a different computer or server executes a program or a case where the computer and the server execute a program in cooperation with each other.

The program may be distributed via a network such as the Internet. Further, the program may be recorded in a computer-readable recording medium such as a hard disk, a flexible disk (PD), a CD-ROM, a magneto-optical disk (MO), and a digital versatile disc (DVD), and may be read from the recording medium by the computer so as to be executed.

According to one aspect, it is possible to improve the accuracy of fault determination using an object detection technique.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a calculation program that causes a computer to execute a process, the process comprising:
    setting, with regard to each of a plurality of frame images included in moving image data on a captured subject, a time interval region including a predetermined time width in time sequence for detection map information relating a detection result of each of types of feature values to a time sequence of the frame images;
    acquiring, with regard to each of a plurality of positions in the time interval region, a distribution state of the detection result in the time interval region in a case where a position of the set time interval region is changed in the time sequence in the detection map information;
    calculating a distributed representation indicating a set of points obtained by projecting the distribution state in each of the positions onto a low-dimensional space; and
    determining, based on a comparison between the acquired distributed representation and the distributed representation obtained from determination target moving image data on the captured subject, whether the determination target moving image data is data on a captured subject in a faulty state.

2. The non-transitory computer-readable recording medium according to claim 1, the process further including detecting, with regard to each of the frame images, a degree of certainty that is an index corresponding to a level of probability that each of predetermined objects is present, wherein
    the acquiring includes acquiring the degree of certainty as the distribution state.

3. The non-transitory computer-readable recording medium according to claim 2, wherein
    the detecting includes detecting a size and a position of a rectangular region which is present in the frame image and in which presence probability of the object is equal to or more than a predetermined value, and
    the acquiring includes acquiring, as the distribution state, the degree of certainty and the size and the position of the rectangular region.

4. The non-transitory computer-readable recording medium according to claim 1, wherein the calculating includes inputting the distribution state to an autoencoder including an intermediate layer made up of two units to calculate a distributed representation indicating a set of points projected onto a two-dimensional space.

5. The non-transitory computer-readable recording medium according to claim 4, the process further including displaying, on a screen, a trajectory of a point projected onto the two-dimensional space in the time sequence.

6. The non-transitory computer-readable recording medium according to claim 1, wherein the detection map information is a two-dimensional map in which the detection result is mapped on a two-dimensional plane whose first axis is one of the types of feature values and whose second axis is the time sequence.

7. A calculation method executed by a computer, the calculation method comprising:
    setting, with regard to each of a plurality of frame images included in moving image data on a captured subject, a time interval region including a predetermined time width in time sequence for detection map information relating a detection result of each of types of feature values to a time sequence of the frame image;

acquiring, with regard to each of a plurality of positions in the time interval region, a distribution state of the detection result in the time interval region in a case where a position of the set time interval region is changed in the time sequence in the detection map information;

calculating a distributed representation indicating a set of points obtained by projecting the distribution state in each of the positions onto a low-dimensional space; and determining, based on a comparison between the acquired distributed representation and the distributed representation obtained from determination target moving image data on the captured subject, whether the determination target moving image data is data on a captured subject in a faulty state.

8. A calculation apparatus comprising:

a memory; and a processor coupled to the memory and configured to:

set, with regard to each of a plurality of frame images included in moving image data on a captured subject, a time interval region including a predetermined time width in time sequence for detection map information relating a detection result of each of types of feature values to a time sequence of the frame image, acquire, with regard to each of a plurality of positions in the time interval region, a distribution state of the detection result in the time interval region in a case where a position of the time interval region set at the setting is changed in the time sequence in the detection map information, calculate a distributed representation indicating a set of points obtained by projecting the distribution state in each of the positions onto a low-dimensional space, and determine, based on a comparison between the acquired distributed representation and the distributed representation obtained from determination target moving image data on the captured subject, whether the determination target moving image data is data on a captured subject in a faulty state.

* * * * *